United States Patent Office 3,083,472
Patented Apr. 2, 1963

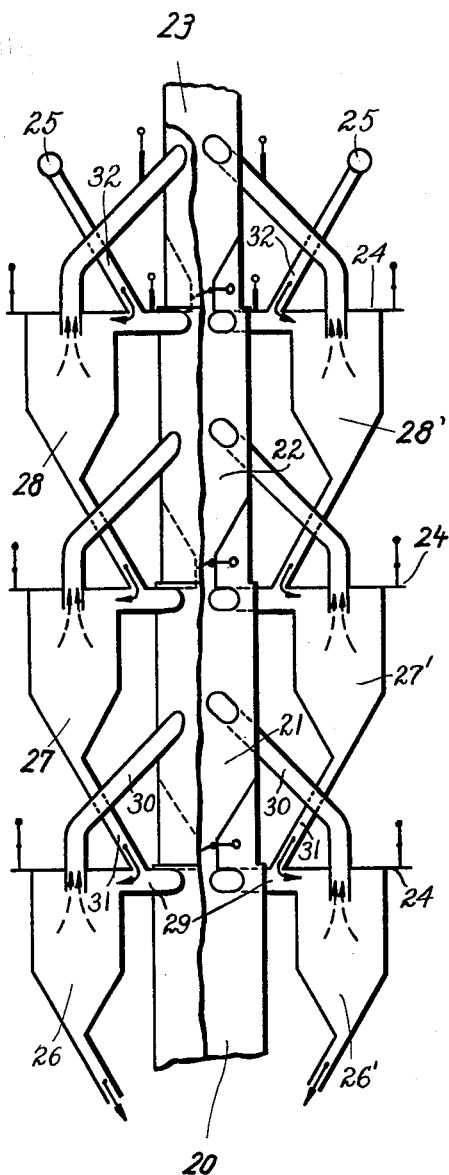
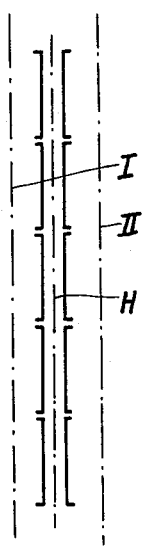
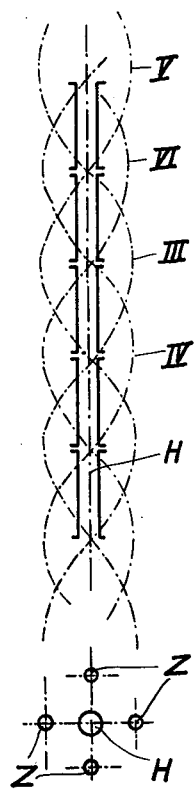
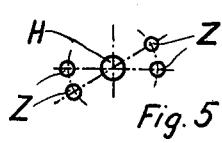
Fig. 2  Fig. 3a  Fig. 4a  Fig. 3  Fig. 4  Fig. 5

3,083,472
APPARATUS FOR PRE-HEATING CEMENT
POWDER OR SIMILAR MATERIALS
Bernd Hermann Helming, an den Tannen 1,
Neubeckum, Westphalia, Germany
Filed Oct. 13, 1959, Ser. No. 846,148
12 Claims. (Cl. 34—57)

The present invention relates to apparatus for pre-heating cement powder or similar materials which are subsequently calcined or sintered in a kiln.

Known devices of this type comprise several cyclones, which are arranged one above the other and connected with each other so that through means of a blower the exhaust gas is sucked through each of the cyclones while the dust exhaust pipe of each cyclone opens into the exhaust gas pipe leading to the next lower cyclone. For this arrangement of the cyclones a rather big supporting framework was required. The cyclones were arranged, for instance, in two rows, the cyclones of the one row being offset relative to those of the other row in a manner so that each cyclone of the one row is level with the gap left between two cyclones of the other row. The exhaust gas pipe of each cyclone stands upright and then leads to the next cyclone in horizontal direction, the dust exhaust pipe of each cyclone opening into the exhaust gas pipe of the lower cyclone. Because of the offset arrangement of the cyclones, the overall height of the complete plant is considerable, especially when it is necessary to arrange several cyclones one above the other to utilize an existing temperature gradient in the exhaust gas. It is another disadvantage of known devices that a great number of elbow pipes is used which have to be cleaned frequently, necessitating an interruption of work of the plant.

It is one object of the present invention to provide an apparatus for pre-heating cement powder or similar materials which eliminates the deficiencies referred to above. It is another object of the present invention to provide an apparatus for pre-heating cement powder or similar materials wherein the cyclones are connected to a vertical main pipe or shaft. The exhaust gas coming from the kiln flows into the lower end of the main pipe which is divided by a partition, preferably arranged above the exhaust gas pipes leading to the cyclones. It is of particular advantage to utilize the main shaft as a support for all parts, thus eliminating the necessity for an additional framework. The main pipe forms a supporting column mounting the cyclones. The dust exhaust pipe of each cyclone can thus open into the exhaust gas pipe leading from the main shaft to the next lower cyclone, or it may open into the main shaft above the opening of the exhaust gas pipe coming from the next lower cyclone, into the main shaft.

Heat exchange between the dust-like material to be heated and the exhaust gas from the kiln will be considerably improved due to the fact that the main shaft forms a whirling chamber into which the exhaust gas pipes open, preferably in tangential direction.

According to the operating conditions, the cyclones will be equally spaced and arranged at various levels or in an offset arrangement around the main shaft in a manner so that the cyclones of each level are located in the same plane.

The cleaning can be done without interrupting the operation of the plant in that according to the present invention, the cyclones connected to the main pipe are shut off either individually or in groups. The exhaust gas and the cement powder are then passed through parallel cyclones so that the plant can operate uninterruptedly.

A particularly suitable construction of the plant is obtained when the main shaft is made up of several lengths of pipe mounting the cyclones. The plant is then assembled from individual subassemblies which can be supplemented by further subassemblies according to the operating conditions. In known manner, the diameter of the main pipe may decrease gradually or stepwise towards its upper end, or the upper cyclones may be of smaller diameter than the lower ones. By this arrangement, the gas velocity may be adapted to the temperature conditions prevailing throughout the total height of the plant and the gas velocity may be kept low. When using an inclined arrangement of the cyclones, the exhaust gas pipes and the dust exhaust pipes may be made of straight pipes so that elbow pipes which very often are a source of trouble, are eliminated.

With these and other objects in view, which will become apparent in the following detailed description, the present invention will be clearly understood in connection with the accompanying drawings, in which:

FIG. 2 is a diagrammatic view of another embodiment; and

Figure 1:
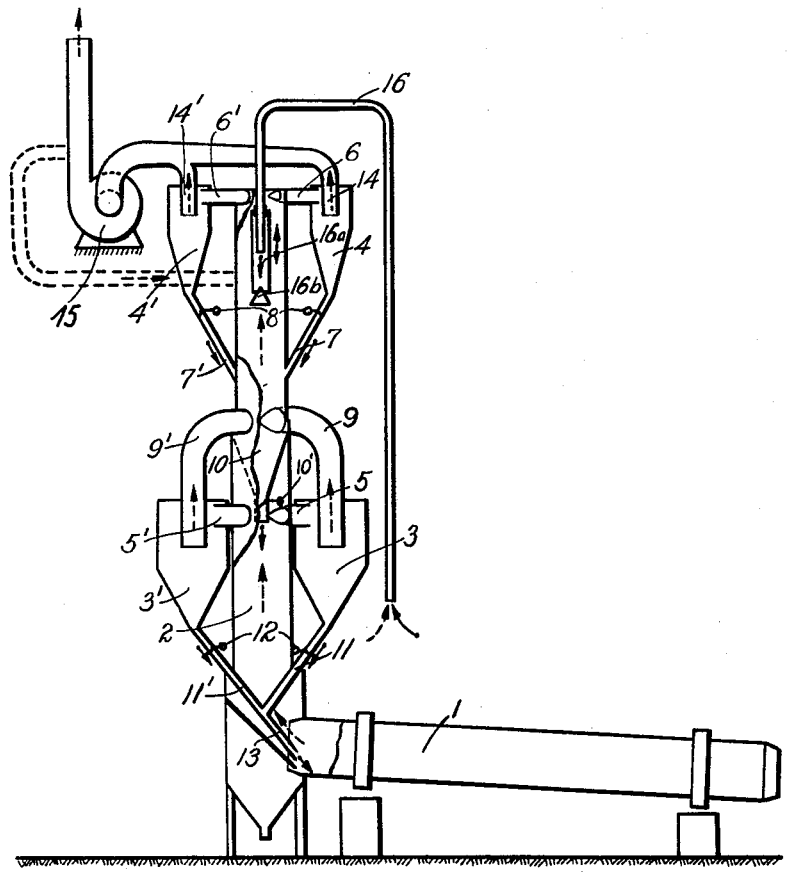
FIGURE 1 is a diagrammatic view of an embodiment of the apparatus designed in accordance with the present invention.

FIGS. 3 and 3a, 4 and 4a and 5 are diagrammatic views of different arrangements of the cyclones on the main shaft.

Referring now to the drawings, and in particular to FIG. 1, the apparatus comprises a rotary kiln 1 and a vertical main pipe or shaft 2, the latter supporting the cyclones 3, 3' and 4, 4'. The exhaust gas leaves the kiln 1 and passes upwards through the main shaft 2 in the direction of the arrows, indicated by dotted lines.

Exhaust gas pipes 5, 5' and 6, 6' open into the cyclones 3, 3', and 4, 4', preferably in tangential direction. Dust exhaust pipes 7 and 7' of the upper cyclones, each one provided with a shut-off member 8, open into the main shaft 2 above the point at which the exhaust gas pipes 9 and 9' coming from the lower cyclones 3 and 3' open into the main pipe 2. Below the last mentioned point, a funnel 10 is arranged in the main shaft 2, the funnel being provided with a shut-off member 10' and forming a partition in the main pipe 2 which forces the exhaust gas leaving the kiln 1 to enter the cyclones 3, 3'. The dust exhaust pipes 11 and 11' of the lower cyclones, which are also provided with a shut-off member 12, open into a chute 13 leading to the kiln 1. The exhaust gas pipes 14 and 14' of the upper cyclones 4 and 4' are connected with the blower 15, which forces the exhaust gas through the main shaft 2 and through the cyclones 3, 3' and 4, 4' and, if desired through a filter (not illustrated) into the open.

Cement powder is supplied to the plant through a pipe 16, either pneumatically or mechanically. Pneumatic feed of the dust-like material is to be preferred, because in this case the cement powder is blown into the main shaft 2 at considerable pressure and speed. Due to the counter-flow, heat exchange is intensified already at the feeding station. At the same time, gas and material are considerably swirled which also intensifies heat exchange. Conveniently, the pipe 16 is arranged in a tube 16a which is adjustable as to its height so that it is possible to introduce the cement powder at the most favorable place in the main shaft 2. Below the outlet opening of the tube 16a, a cone 16b is provided, to distribute the material equally over the duct area of the main pipe 2.

Preferably, the exhaust gas pipes 5, 5′ and 6, 6′ open into the main pipe 2 in tangential direction to give the exhaust gas a twist and to whirl it around, together with the material. It is to be understood, that an additional number of cyclones may be connected to the main pipe which are then arranged at the same level, at a higher level, or offset to the cyclones illustrated.

Referring now again to the drawings, and in particular to FIG. 2, the complete plant is divided into subassemblies, which are placed one on the other and each comprising a part of the main pipe 2 and several cyclones level with each other. The plant comprises main pipe parts 20, 21, 22, and 23 mounted on top of each other and each provided with a platform 24. The lower part 20 is connected to the kiln (not shown) in known manner, while the upper part 23 is connected with a blower (not shown) and provided with feed hoppers 25 for the material to be heated.

Below each platform 24, which also forms a partition for the main pipe 2, cyclones 26, 26′, 27, 27′ and 28, 28′ are arranged at different levels and located in the same plane at each level. Two or more cyclones may be provided at each level which are then arranged around the main pipe 2. Exhaust gas pipes 29 lead from the main pipe 20 to the cyclones 26 and 26′, the gas passing through the pipe in the direction of the arrows indicated by dotted lines. The exhaust gas pipes 30, leading away from the cyclones 26 and 26′, are disposed vertically in the center of the cyclones 26 and 26′ and then lead to the following main pipe part 21.

The dust exhaust pipes 31, extending from each of the cyclones, open into the next lower exhaust gas pipe 29. The material is supplied from the feed hoppers 25, through the pipes 32, into the exhaust gas pipes leading to the uppermost cyclones. Each length of main pipe is constructed in the same manner. The diameter of the main pipe and of the cyclones may decrease towards the upper end. By means of shut-off members or the like (not shown) each cyclone and exhaust gas pipe may be shut off, so that parts of the plant can be put out of operation, if repairs or cleaning are necessary, without interrupting the operation of the plant.

When the main pipe is made sufficiently strong, it can support all of the cyclones, thus saving an additional framework. The main pipe may be secured like a mast and the platforms form floors for the workmen.

FIGS. 3 to, 3a, 4, 4a and 5 show different arrangements of cyclones Z and the main pipe H. According to FIGS. 3 and 3a, the cyclones Z are arranged on both sides of the main pipe H on the axes I—II, one above the other. In FIGS. 4 and 4a, four rows of cyclones Z are spirally arranged around the main pipe H on lines III, IV, V, VI, while in FIG. 5 they are disposed similar to the arrangement shown in FIGS. 4 and 4a, however, offset relative to each other. In any case, the number and the arrangement of the cyclones is of no importance with respect to the present invention. They may also be inclined relative to the main pipe H, so that dust exhaust pipes and the exhaust gas pipes may be formed of short, straight pipes.

It is also possible to divide the main pipe into two parts, i.e. into a lower and an upper part. The lower part may have two or more outlets opening into two or more cyclones or only one cyclone, the gas in the cyclones being passed into the upper main pipe.

While I have disclosed several embodiments of the present invention, it is to be understood that these embodiments are given by example only and not in a limiting sense, the scope of the present invention being determined by the objects and the claims.

I claim:
1. An apparatus for pre-heating cement powder or similar fine-grained, solid material subsequently calcined or sintered in a kiln, comprising
    a hollow substantially vertical main shaft divided into a plurality of sections,
    each of said sections communicating with the adjacent section,
    means for closing the communication between each pair of adjacent sections,
    at least two cyclones disposed vertically above each other adjacent said hollow main shaft and coordinated to corresponding sections of said hollow main shaft, to permit parallel gas feeding to said cyclones,
    a kiln feeding exhaust gases to the lowermost of said sections of said hollow main shaft, and providing an upward gas stream to feed selectively said exhaust gases through said hollow main shaft, said cyclones only, and both in part through said hollow main shaft and in part through said cyclones,
    a first exhaust gas pipe leading tangentially from each of said sections to the upper portion of the corresponding cyclone,
    a second exhaust gas pipe leading centrally from each cyclone upwardly to the adjacent upper section of said hollow main shaft,
    a blower disposed on top of said hollow main shaft,
    a third exhaust gas pipe of the uppermost of said cyclones communicating with said blower,
    said hollow main shaft and said first second and third exhaust gas pipes constituting gas feeding members,
    a dust exhaust pipe extending from the bottom of each of said cyclones and communicating with said gas feeding members to provide an at least partly downward stream of said fine-grained, solid material in a downward counter direction to that of gas stream, and
    a pipe feeding said fine-grained, solid material to the top portion of said hollow main shaft.

2. The apparatus, as set forth in claim 1, wherein said dust exhaust pipe connects each of said cyclones with the second exhaust gas pipe of the adjacent lower cyclone.

3. The apparatus, as set forth in claim 1, wherein each of said dust exhaust pipes terminates at a point of said hollow main shaft disposed slightly above the point of entrance of said second exhaust gas pipe leading from the adjacent lower cyclone to said hollow main shaft.

4. The apparatus, as set forth in claim 1 wherein the diameter of said hollow main shaft in each of said sections is smaller than that in the next lower section, so that the lowermost of said sections has the largest diameter.

5. The apparatus, as set forth in claim 33, which includes a tube disposed in the upper portion of said hollow main shaft and receiving said pipe feeding said fine-grained, solid material into said hollow main shaft, a tube open at both ends and receiving the inner end of said tube and a distributing cone disposed at the lower opening of said tube.

6. The apparatus, as set forth in claim 1, which includes means for shutting off each of said cyclones from the flow of said gases.

7. The apparatus, as set forth in claim 1, which includes means for shutting off a group of said cyclones from the flow of said gases.

8. The apparatus, as set forth in claim 1, wherein said hollow main shaft constitutes the carrier for said cyclones and for said first and second exhaust gas pipes.

9. The apparatus, as set forth in claim 1, wherein each of said sections of said hollow main shaft forms jointly with the corresponding cyclones a single unit.

10. The apparatus, as set forth in claim 1 wherein a plurality of cyclones is connected in parallel relative to each other in coordination to each of said sections of said hollow main shaft, said first exhaust gas pipe and said second exhaust gas pipe of each of said cyclones provide communication between said cyclones and said hollow main shaft.

1. The apparatus, as set forth in claim 10, wherein said cyclones disposed at the same level relative to said hollow main shaft are at an equal distance from and around the corresponding section of said hollow main shaft, said cyclones of the next higher and of the next lower sections of said main shaft being set off relative to said cyclones disposed at an adjacent level.

12. The apparatus, as set forth in claim 10, wherein said cyclones are disposed along at least one spiral line around said main shaft.

References Cited in the file of this patent

UNITED STATES PATENTS 2,802,280     Sylvest _____ Aug. 13, 1957

FOREIGN PATENTS 703,951     Great Britain _____ Feb. 10, 1954
747,586     Great Britain _____ Apr. 10, 1956